March 30, 1954 H. V. SCHWEITZER ET AL 2,673,548
BODY PAINTING MACHINE
Filed May 1, 1951
9 Sheets-Sheet 1

FIG. 1

INVENTORS
HOWARD V. SCHWEITZER &
WILLIAM C. ALBERTSON, JR.
BY

ATTORNEYS

March 30, 1954    H. V. SCHWEITZER ET AL    2,673,548
BODY PAINTING MACHINE Filed May 1, 1951

INVENTORS
HOWARD V. SCHWEITZER &
WILLIAM C. ALBERTSON, JR.
BY
ATTORNEYS

March 30, 1954

H. V. SCHWEITZER ET AL 2,673,548

BODY PAINTING MACHINE

Filed May 1, 1951

INVENTORS
HOWARD V. SCHWEITZER &
WILLIAM C. ALBERTSON, JR.
BY
Ely & Frye
ATTORNEYS March 30, 1954  H. V. SCHWEITZER ET AL  2,673,548
BODY PAINTING MACHINE
Filed May 1, 1951
9 Sheets-Sheet 5

FIG. 7

INVENTORS
HOWARD V. SCHWEITZER &
WILLIAM C. ALBERTSON, JR.
BY Ely & Frye
ATTORNEYS

March 30, 1954    H. V. SCHWEITZER ET AL    2,673,548
BODY PAINTING MACHINE
Filed May 1, 1951
9 Sheets-Sheet 9

INVENTORS
HOWARD V. SCHWEITZER &
WILLIAM C. ALBERTSON, JR.
BY Ely & Frye
ATTORNEYS Patented Mar. 30, 1954

2,673,548

UNITED STATES PATENT OFFICE 2,673,548

BODY PAINTING MACHINE

Howard V. Schweitzer, Fort Lauderdale, Fla., and William C. Albertson, Jr., Lakewood, Ohio; said Albertson, Jr., assignor to said Schweitzer Application May 1, 1951, Serial No. 223,884

14 Claims. (Cl. 118—321)

The present invention relates to an improvement in painting machinery and more particularly to a machine for painting a series of relatively large irregular vehicle bodies or other bodies carried by a conveyor system. The present invention is particularly adapted for use in conjunction with relatively short body conveyor systems.

This application is a continuation-in-part of our co-pending application Serial No. 192,644 for "Body Painting Machine," filed October 28, 1950, which is in turn a continuation of our application Serial No. 184,464 for "Body Painting Machine," filed September 12, 1950, and abandoned February 7, 1951, in favor of application Serial No. 192,644.

The above applications disclose a body painting machine which for the first time embodies a practical method of automatically uniformly coating large irregular bodies on a production line basis. According to this method, a target body is rotated on its longitudinal axis as it is carried by a paint gun or a battery of such guns. The paint gun is moved in and out and is also traversed or rotated in a limited arc. The movements of the rotating target body and the shifting paint gun are so related as to result in the deposit of a substantially uniform thickness of paint or other coating composition on the target body, as is fully disclosed in the above applications.

To enable the above machine to function as part of a production line, it was necessary to provide means to properly coordinate rotation of the target body and motion of the paint gun regardless of variation in spacing between successive target bodies coming down the line. To accomplish this, the above machine provided a reciprocating carriage which carried elements controlling the paint gun movements together with a member adapted to engage and rotate the mounting of each successive target body. As a given target body approached the painter, the carriage was engaged and carried along by a conveyor projection associated with the given target body so that the longitudinal displacement of the carriage was the same as that of the target body mounting. The target rotating member on the carriage was automatically operated to engage and rotate the target body mounting. The position of the various controlling elements on the reciprocating carriage, including the target body rotating means, was a function of the longitudinal displacement of the carriage so that through any given painting cycle, relative movement of the target body and gun was properly coordinated. At the end of each painting operation the carriage was freed from the conveyor projection. It was then necessary to provide means to automatically return the carriage to its initial position to prepare the machine for reception of succeeding target body. The operation of the machine was thus discontinuous, the machine resetting itself after each painting operation.

While theoretically it would have been possible to use the conveyor system to drive the above machine through its painting cycle, this was not found to be feasible as a practical matter due to the high inertial forces, stresses and deformations which resulted particularly with respect to the cantilevered reciprocating carriage and the target body rotating linkage. Moreover, the carriage had to be returned to its initial position at the end of each painting operation. Accordingly it was necessary to provide auxiliary power, clutch and "booster" devices to drive the carriage during each painting operation and to return the carriage between painting operations.

The present invention contemplates a painting or coating machine which embodies the previously disclosed painting method but the operation of which is continuous in the sense that no resetting of the machine is necessary. Independently of the spacing between successive target bodies carried by the conveyor, the present machine automatically begins its painting operation as any given target body approaches it and at the end of each painting operation, the machine is in position to immediately receive a successive target body.

The present machine is particularly advantageous in that the non-reciprocating continuous drive for the paint gun controls eliminates the need for heavy structural supporting members and long control linkages formerly necessitated by the reciprocating carriage and the various control linkages are of substantially lighter construction.

A further object and advantage of the present invention is the provision of an automatic body painting machine which is powered solely by its associated conveyor without the need for any auxiliary power means.

In certain coating operations, and particularly in the assembly line painting of vehicle bodies, it is highly desirable to change over quickly from one body style to another, and then if desired to a third and a fourth. An object of the present invention is to provide an automatic body painting machine in which any desired changeover may be effected by a relatively compact and inexpensive mechanism which may be operated only during the intervals between successive painting operations.

A further object of the invention is to provide a novel impact minimizing indexing means whereby rotatable mountings of target bodies approaching the body painter are indexed to a given rotative position and then independently given an initial turning movement as they mesh with a fixed gear rack.

General structural organization

The general structural organization of the invention is best understood by an examination of Figures 1, 2, 3 and 4. The associated conveyor system comprises an overhead I-beam 10 upon which a series of dollies 11 and 12 are suspended by rollers 13 and 14 respectively. The dollies are driven along the I-beam 10 by a conveyor chain 15. Each pair of dollies 11 and 12 in turn support a carriage I-beam 16. The I-beam 16 is rollably supported by the rollers 9 on the dolly 11 and it is simply suspended from the dolly 12. This arrangement provides a degree of play in the spacing between the dolly 11 and the dolly 12 which makes possible the provision of bends or curves in other portions of the conveyor system.

Each I-beam 16 has depending therefrom rear hanger 17 and forward hanger 18 which are adapted to rotatably support a spit mounting 19 to which a target body 20 is securely bolted. The axis of rotation of the spit preferably passes through the center of gravity of the target body and spit.

Figure 1:
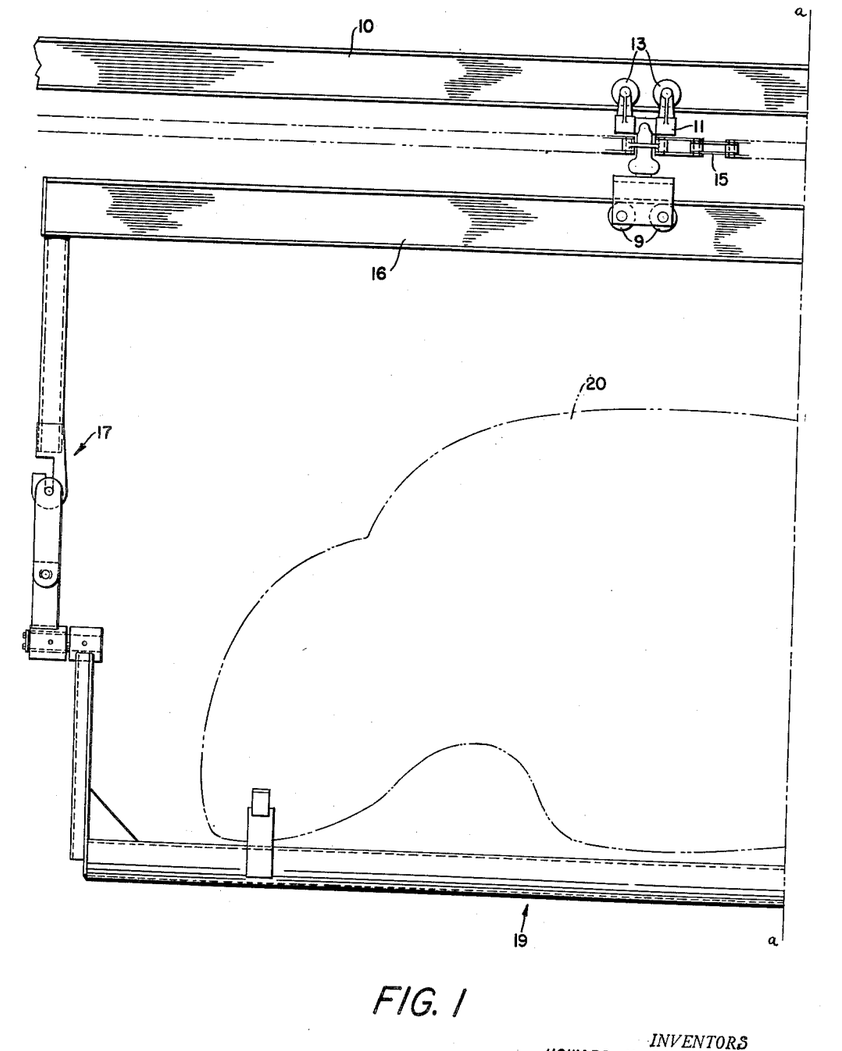
Figures 1 through 4 together constitute a complete side elevation of the body painter in association with an overhead conveyor system.
Figure 2:
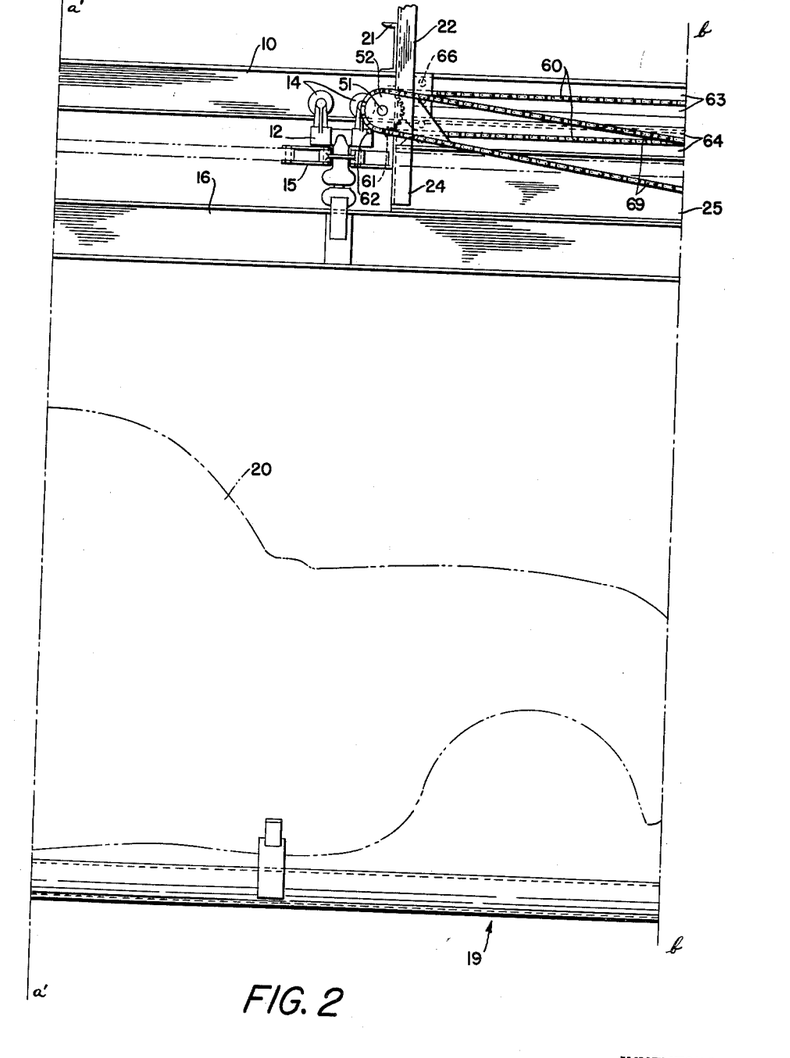
Figure 3:
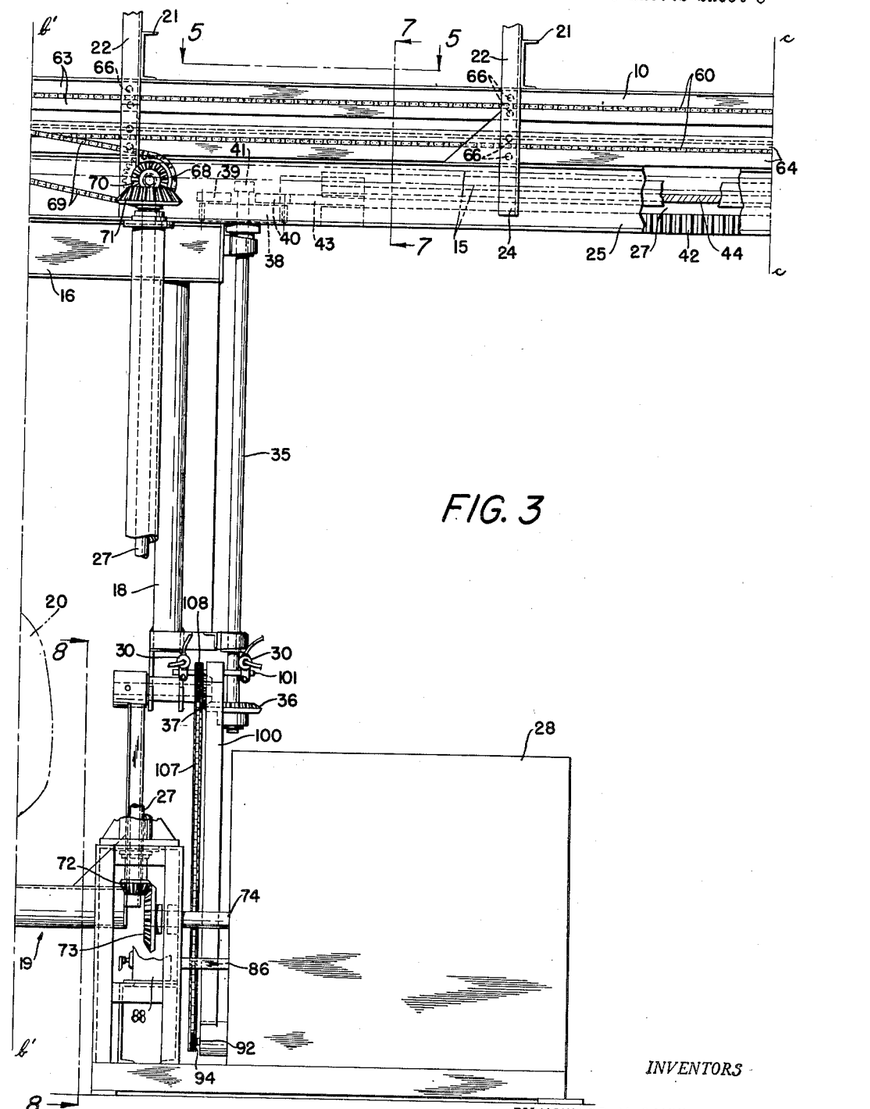
Figure 4:
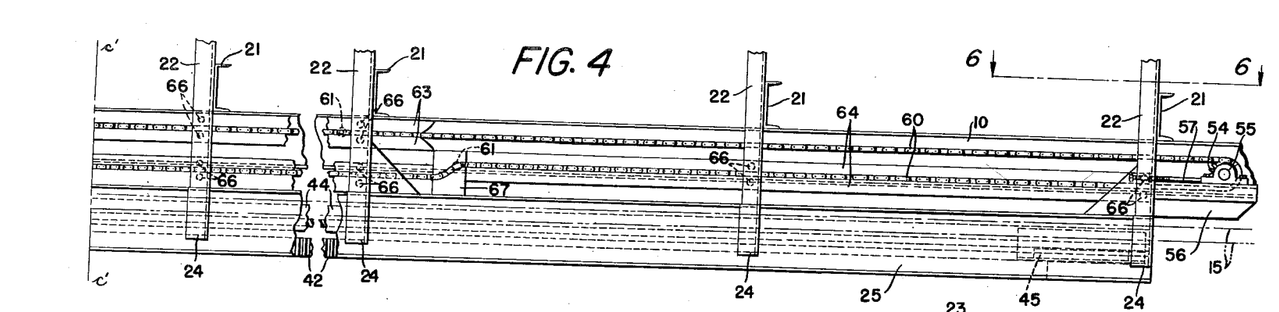
Figure 7:
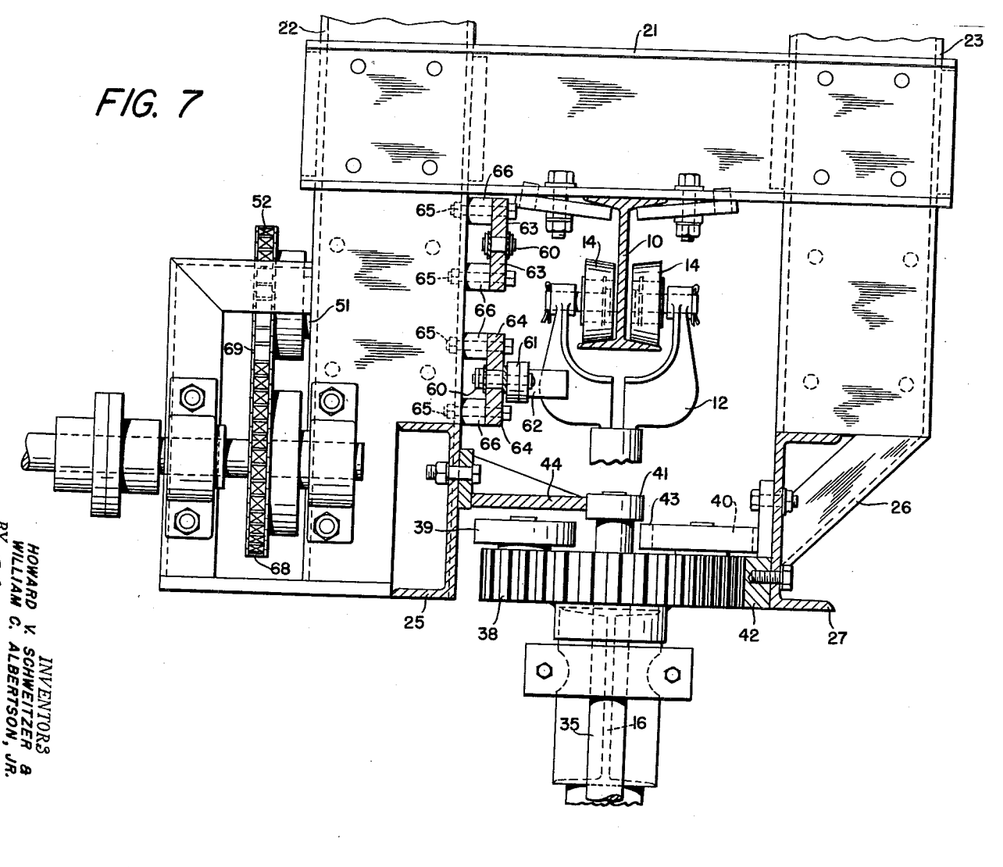
Figure 7 is a cross section taken on line 7—7 in Figure 3.

The interaction between successive carriages and the body painting machine is effected by that portion of the mechanism illustrated at the top of Figures 2 and 3 and in Figure 4. The various elements of this mechanism are supported by a frame of beams surrounding the I-beam 10. Longitudinally spaced transverse beams 21 are clamped to the I-beam 10 (see Figure 7) and have fixed thereto the front vertical beams 22 and the rear vertical beams 23. The beams 22, together with diagonal bracers 24, support a front longitudinal beam 25 and the beams 23 together with the diagonal bracers 26 support a rear longitudinal beam 27. To avoid an unduly heavy load on the I-beam 10, the vertical beams 22 and 23 may be supported by overhead ceiling elements (not shown). Through a shaft 27 the mechanism supported by this frame of beams drives the paint gun control cams which are located behind the wall 28 and are fully illustrated in Figures 8, 9 and 10.

The paint gun 30 is shown in Figure 3. Actually a pair of guns is illustrated and it will be apparent that the number of guns mounted to move together is a matter of choice depending on, among other things, the width of target area it is feasible to cover at one time. While the term "paint gun" is used throughout this introduction and parts of the specification and claims for reasons of convenience, it is to be understood that this term includes an array of guns mounted to move together.

Vehicle rotating drive and indexing means therefor

Figure 5:
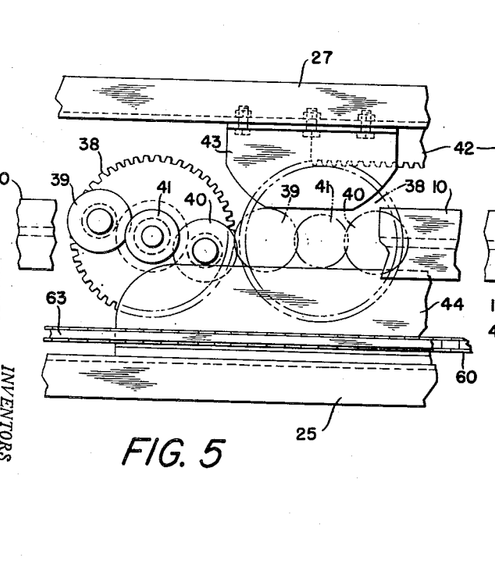
Figure 5 is a view taken along line 5—5 in Figure 3.
Figure 6:
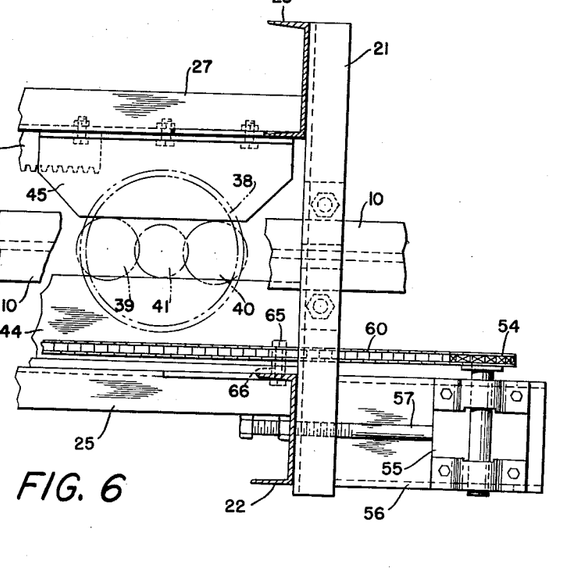
Figure 6 is a view taken along line 6—6 in Figure 4.

Each carriage rotatably mounts a vertical shaft 35 which is in driving engagement with the spit mounting 19 through the bevel gears 36 and 37. Fixed to the top of the shaft 35 is an indexing gear assembly best seen in Figures 5, 6 and 7. The indexing gear assembly comprises a large gear 38, indexing rollers 39 and 40 mounted diametrically opposite each other on the gear 38 and an upper guide roller 41 which is coaxial with the shaft 35.

Mounted on the rear longitudinal beam 27 is a fixed rack 42 designed to mesh with the gear 38. Also mounted on the beam 27 immediately above the forward end of the rack 42 is an indexing cam 43 adapted to engage the rollers 39 and 40. On a slightly higher level a longitudinally extending guide cam 44 is mounted on the front longitudinal beam 25. The cam 44 is designed to engage the guide roller 41.

The forward end of the rack 42 is located above the paint gun 30 and the length of this rack is slightly greater than the length of the target body. The shaft 35 and gear 38 are located at the forward end of the target body carriage. Thus, the engagement of the gear 38 with the rack 42 will occur during translation of the target body past the paint gun. As a given carriage approaches the paint gun, its associated indexing gear assembly approaches the forward end of the rack 42. The roller 41 engages the cam 44 to align the carriage in a vertical position. Shortly thereafter one of the rollers 39 or 40 engages the indexing cam 42. The surface of this cam is so developed that regardless of the direction in which the gear 38 is turned by initial contact with the cam 42 the final motion imparted to the gear 38 will be counterclockwise, as viewed in Figure 5, so that meshing with the rack 42 will involve a minimum of impact between the cooperating teeth. Due to the interaction of the rollers 39 and 40 with the cam 43, these rollers must be longitudinally aligned when the gear 38 must be in one of two rotative positions when initial meshing with the rack occurs. These two rotative positions are 180 degrees apart and the drive ratio from the bevel gear 36 to the bevel gear 37 is one to two so that in either of the two rotative positions of the gear 38, the spit 19 and target body 20 are in the same rotative position. The rollers 39 and 40 are positioned on the gear 38 so that when they are longitudinally aligned the spit and its associated target body are in exact vertical position. Thus successive target bodies are always vertically positioned when their associated gears 38 initially mesh with the rack 42. As a given carriage continues to be advanced by the conveyor chain 15, the gear 38 is rotated to in turn rotate the target body.

As the rear of the target body passes the paint gun, the gear 38 approaches the end of the rack 42. Immediately above the end of the rack a cam 45 is mounted on the rear longitudinal beam 27. This cam engages the rollers 39 and 40 as the gear 38 leaves the rack 42. The cam 45 holds the rollers 39 and 40 in longitudinally aligned position for a short interval to assure that the target body leaves the painting station in a vertical position rather than continuing to rotate due to inertia.

Cam actuating linkage

Mounted on the front vertical beam 22, which is several feet ahead of the paint gun, is a shaft 51 on which a front sprocket 52 and a rear sprocket 53 are mounted. Another sprocket 54 is mounted on a pillow 55 which is in turn slidably mounted on a cantilever 56 welded to the last front vertical beam 22. A stud 57 is threaded through a hole in the beam 22 and bears against the pillow 55 to serve as a slack take up means.

Figure 13:
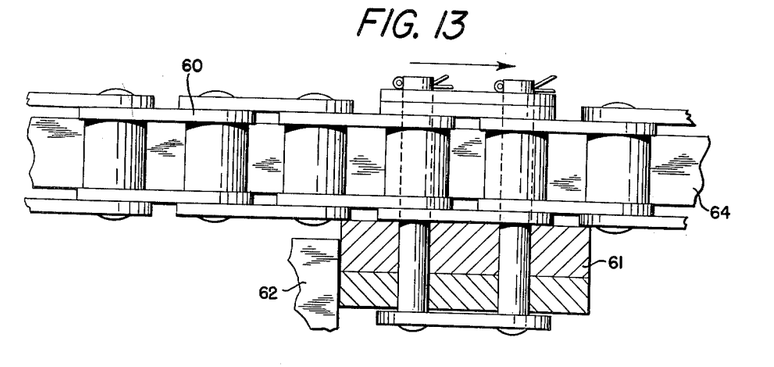
Figure 13 is a detailed view of a portion of the carriage engaged chain showing a lug mounted thereon.

An endless chain 60 meshes with the sprockets 53 and 54. At evenly spaced intervals three dogs 61 are mounted on this chain in the manner illustrated in detail in Figure 13. These dogs are designed to be engaged by driving lugs 62 welded to the successive front dollies 12. Slotted chain guideways 63 and 64 are bolted to and spaced from the front vertical beams 22 by bolts 65 and sleeves 66. The bottom guideway 64 comprises two stepped sections divided by a block 67 (Figure 4) having an S-slot formed therein.

The sprocket 52 is connected with a sprocket 68 by a chain 69. The vertical shaft 27 is driven by the sprocket 68 through the bevel gears 70 and 71. Through another pair of bevel gears 72 and 73 the shaft 27 drives the camshaft 74.

As a target body reaches the painting station and starts to turn, one of the dogs 61 is engaged by a lug 62. The chain 60 is thereupon advanced until the engaged dog 61 is lifted out of engagement by the slot in block 67 whereupon the chain 60 stops with the succeeding dog 61 in position to be engaged by a succeeding lug 62. The advance of chain 60 during engagement by any given lug 62 is just sufficient to turn the camshaft 74 through one complete revolution.

Paint gun control linkages and cams

The control of the paint gun in the present body painter is most clearly disclosed in Figures 8-12. A sleeve 75 is slidably keyed to the shaft 74 and forms the center element of a hexagonal slotted drum comprising the radial bracers 76, the longitudinal members 77 and the cam mounting flanges 78. Cam segments 79 are bolted to the flanges 78 to form a total of twelve radial control cams. One end of the sleeve 75 is supported by a slotted plug 80 which is engaged by the yoke 81 which is fixed to the shaft 82. The yoke 81 is shifted through a lever 83, a link 84, a bell crank 85, a long link 86 and a lever 87 fixed to the output shaft of a speed reducer 88. The speed reducer 88 is driven by a crank handle 89 and the cams 79 may thus be shifted longitudinally on the shaft 74 by cranking the handle 89. It will be noted that this shifting linkage is such that the link 86 exactly duplicates the longitudinal movement of the cams 79.

Mounted for rotation in bearings 90 and parallel to the shaft 74 is a sleeve 91. A shaft 92 is rotatably contained within the sleeve 91 and has a spur gear 93 attached to one end thereof and a sprocket 94 attached to the other end.

Figure 8:
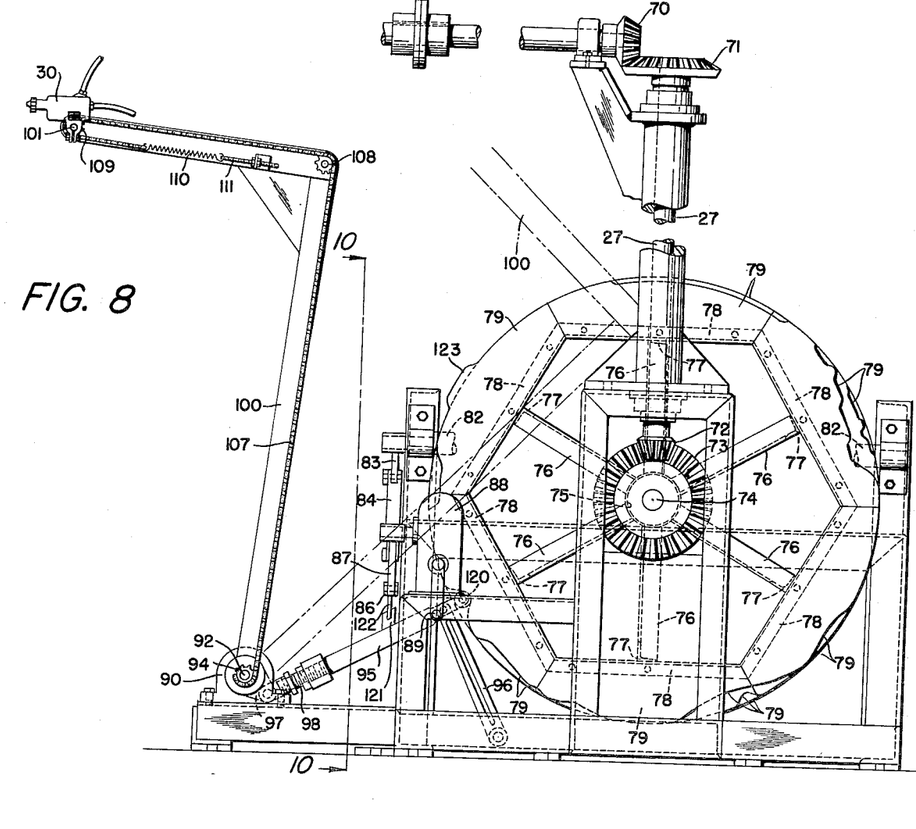
Figure 8 is a view taken along line 8—8 in Figure 3.
Figure 9:
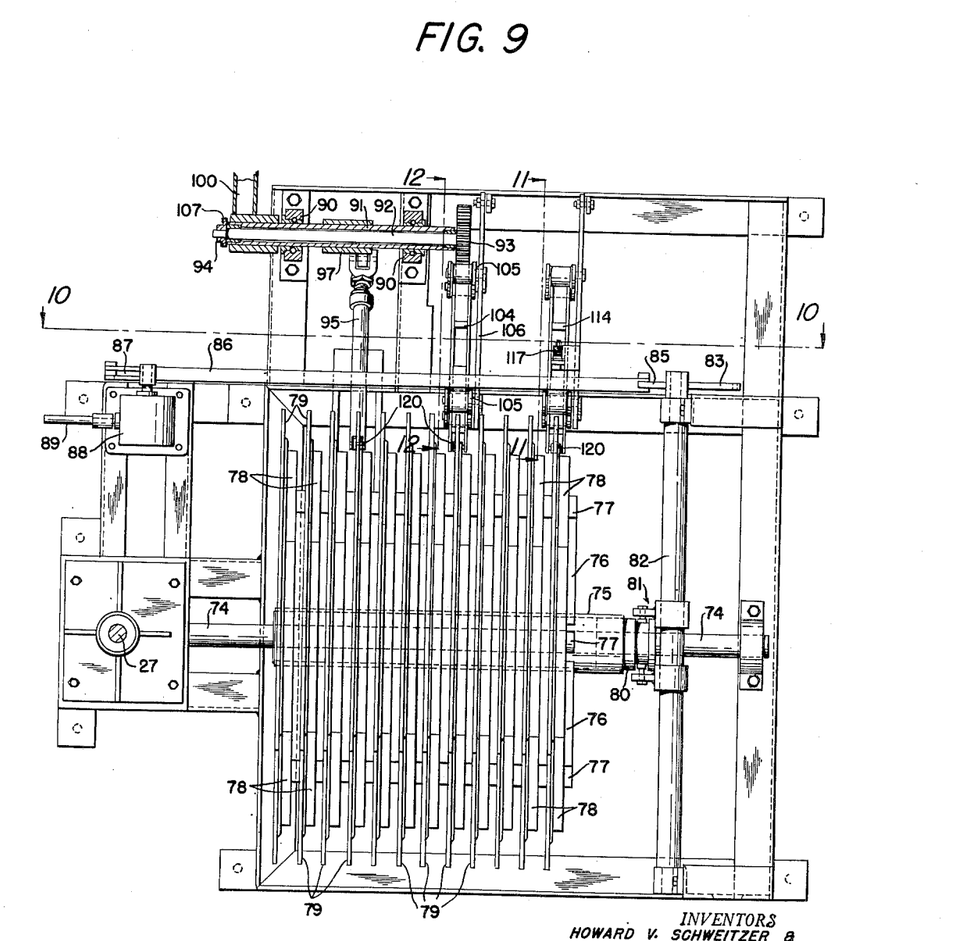
Figure 9 is a view, partly in section, of the shifting cam assembly which may be employed in the body painter together with part of the linkage controlled thereby.
Figure 10:
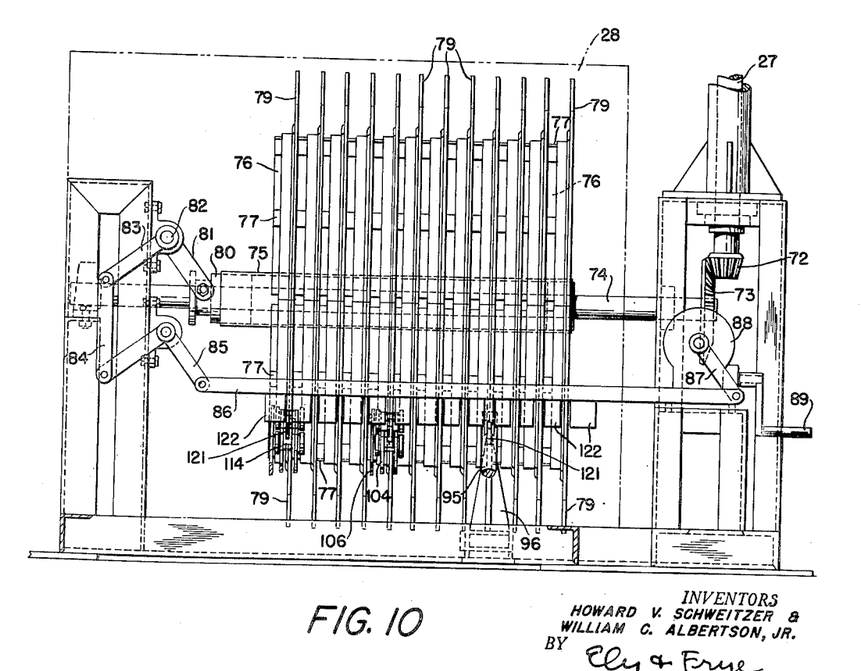
Figure 10 is a cross section taken on line 10—10 in Figure 9.

Figures 8 and 9 best illustrate the gun in and out control. A cam follower 95 is pivoted adjacent one end to a link 96 and at the other end to a crank arm 97 which is secured to the sleeve 91. The lower end of the link 96 is pivoted to a fixed base member so that the cam follower is constrained to move in a substantially longitudinal path. A threaded connection 98 may be provided in the cam follower 95 to enable the length of this member to be adjusted. An L shaped arm 100 is secured to the sleeve 91 and the paint gun bracket 101 is rotatably mounted at the outer end thereof.

Figure 12:
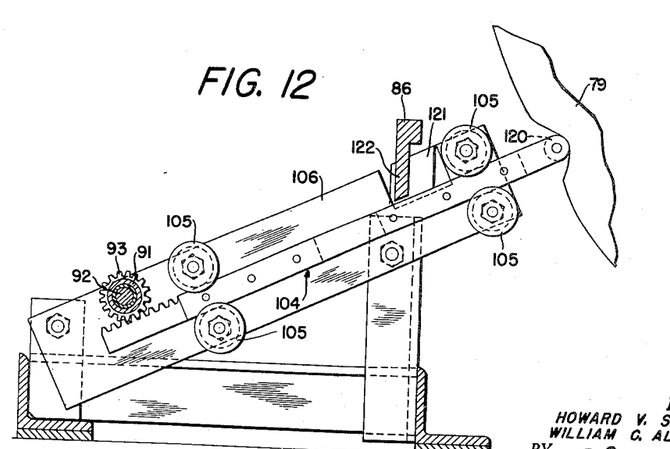
Figure 12 is a detailed view of the cam follower linkage which constitutes the paint gun traverse control.

Figures 8, 9 and 12 best illustrate the gun tilting linkage. A reciprocating cam follower 104 is constrained to between pairs of rollers 105 mounted on a fixed plate 106. The lower end of this cam follower comprises a rack which meshes with the spur gear 93. One end of a chain 107 is fastened to the sprocket 94 and is wrapped partially around this sprocket. The chain 107 also passes around a sprocket 108 mounted on the arm 100 and around a sprocket 109 which is fixed to the rotatably mounted paint gun bracket 101. The upper end of the chain 107 is connected by a spring 110 to an adjustable threaded stud 111 which is mounted on the arm 100.

Figure 11:
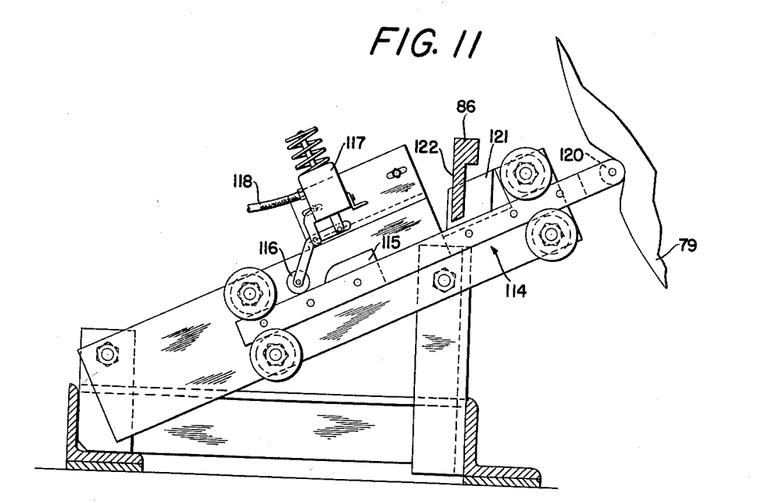
Figure 11 is a detailed view of the cam follower linkage which constitutes the paint gun on and off control.

The gun on and off control is illustrated in Figure 11. A cam follower 114 is constrained to move in a reciprocating path in a manner similar to the follower 104. A cam 115 is fixed to the follower 114 and this cam raises a cam follower 116 to close an air valve 117 which controls the air supply through the line 118 to the paint guns.

The cam followers 95, 104 and 114 are all provided with rollers 120 at their upper ends to facilitate following of each associated radial cam 79. These cam followers are also all provided with rigidly attached keying fins 121. These keying fins normally fit within slots formed in a keying bar or "comb" 122 which depends from the link 86. The resultant interlock presents longitudinal shifting of the sleeve 75 and the cams carried thereby. However, at one common angular location 123 each of the cams 79 has an unusually high surface. These camming surfaces are high enough to move each fin 121 out of its associated slot in the comb 122 to enable longitudinal shifting of the cams. The angular location 123 is chosen so that the fins 121 are so shifted only at the position of the dogs 61 illustrated in Figures 2 and 4. This arrangement makes it impossible to shift the cams 79 during any given painting operation. However, between painting operations the handle 89 may be cranked to select any one of four trios of cams by which the cam followers 95, 104 and 114 are to be actuated in the immediately succeeding painting operation. Thus, during the time between painting operations, the body painter may be quickly and easily adjusted to accommodate any one of four different body styles.

The cam followers 95, 104 and 114 are all broad enough at their cam engaging ends to permit shifting to adjacent cams at the angular location 123. However, to facilitate shifting, a longitudinal connecting surface (not shown) may be welded to the high surface of each cam at the angular location 123.

It will be clear from the above that upon the completion of a given painting operation the body painter is immediately ready to receive, index and initiate rotation and painting of a successive target body without the necessity of any automatic or manual resetting between painting operations and without any auxiliary power booster or clutching elements. It will be apparent that a number of modifications in the specific elements of the invention may be made and accordingly the scope of the invention is not confined to the specific embodiment disclosed above, but is limited solely by the following claims.

What is claimed is:

1. A body painter comprising a series of carriages adapted to be translated by a conveyor past a fixed station, each carriage being adapted to rotatably mount a target body for rotation about an axis parallel to the direction of conveyor travel, a body rotating linkage on each carriage in driving engagement with the associated target body, paint spraying means at said station aiming toward the path of travel of said target bodies, means to mount said spray means for in and out movement and for traversing movement, cams, cam controlled means to move said paint spraying means in and out, cam controlled means to traverse said paint spraying means, endless means at said station engageable by successive carriages to drive said cams, and fixed means at said station engageable by successive body rotating linkages to rotate successive target bodies.

2. A body painter comprising a series of carriages supported by a conveyor at spaced intervals, said conveyor being adapted to translate said carriages past a fixed station, each carriage being adapted to rotatably mount a target body for rotation about an axis parallel to the direction of conveyor travel, a body rotating linkage on each carriage in driving association with the associated target body, a paint gun at said station aiming toward the path of travel of said target bodies, rotatable cams mounted adjacent said station, endless chain means at said station, said chain means having spaced lugs thereon engageable by successive carriages to cause said endless chain to be moved through a given fraction of a cycle by each successive carriage, a drive linkage between said endless chain and said rotatable cams whereby said cams complete one revolution for each said given fraction of a cycle, cam controlled means to move said gun toward and away from said path of travel of said target bodies, cam controlled means to vary the elevation of said gun, means mounting said gun for said toward and away movement and for said elevational movement, and fixed means at said station engageable by successive body rotating linkages to rotate successive target bodies.

3. A body painter comprising a series of carriages supported by a conveyor at spaced intervals along said conveyor whereby said carriages are translated past a fixed station, a cradle rotatably mounted on each of said carriages for rotation about an axis parallel to the direction of conveyor travel and adapted to have a target body fixed thereto, a body rotating linkage on each carriage in driving engagement with its associated cradle, a paint gun at said station aiming toward the path of travel of said target bodies, rotatable cams mounted adjacent said station, endless chain means at said station, said chain means having spaced lugs thereon, said chain means being constrained to move in such a path that one of said lugs obstructs the path of an element on each conveyor translated carriage to cause said endless chain to be moved through a given fraction of a cycle by each successive carriage, a drive linkage between said endless chain and said rotatable cams whereby said cams complete one revolution for each said given fraction of a cycle, cam controlled means to move said gun toward and away from said path of travel of said target bodies, cam controlled means to vary the elevation of said gun, means mounting said gun for said toward and away movement and for said elevational movement, and fixed means at said station engageable by successive body rotating linkages to rotate successive target bodies.

4. A body painter comprising a series of carriages supported by a conveyor at spaced intervals along said conveyor whereby said carriages are translated past a fixed station, each carriage being adapted to rotatably mount a target body for rotation about an axis parallel to the direction of conveyor travel, a body rotating linkage on each carriage in driving engagement with its associated target body, a driving gear associated with each body rotating linkage and having two rotative positions at which the associated body is in a given single rotative position, paint spraying means at said station aiming toward the path of travel of said target bodies, means mounting said paint spraying means for in and out movement and for traversing movement, cams, cam actuated means to move said paint spraying means in and out, cam actuated means to traverse said paint spraying means, endless means at said station engageable by successive carriages to drive said cams, fixed rack means at said station engageable by successive driving gears to rotate successive target bodies, means associated with said rack means and with said driving gears to initially engage said gears with said rack at one of said two rotative positions of each of said driving gears.

5. A body painter comprising a series of carriages supported by a conveyor at spaced intervals along said conveyor whereby said carriages are translated past a fixed station, a cradle rotatably mounted on each of said carriages for rotation about an axis parallel to the direction of conveyor travel and adapted to have a target body fixed thereto, a target body rotating linkage on each carriage in driving engagement with its associated cradle, a driving gear associated with each target body rotating linkage and having two rotative positions at which the associated target body is in a given single rotative position, paint spraying means at said station aiming toward the path of travel of said target bodies, means mounting said paint spraying means for movement relative to passing target bodies, endless cams, means actuated by said endless cams to control the movements of said paint spraying means relative to passing target bodies, endless means at said station engageable by successive carriages to drive said endless cams, fixed rack means at said station engageable by successive driving gears to rotate successive target bodies, and means associated with said rack means and with each of said driving gears to initially engage each of said driving gears with said rack at one of said two rotative positions of each of said driving gears.

6. A body painter as defined in claim 5 in which said means associated with said rack and each of said driving gears comprises a pair of diametrically opposite rollers on each of said driving gears and a cam adjacent the initially engaged end of said rack and overlying one side of the path of each of said driving gears, said cam having a rising leading face and a flat center face whereby one of said pair of rollers will initially contact said cam and rotate the associated driving gear to bring both of said pair of rollers into contact with said cam and to turn the associated driving gear to one of said two rotative positions.

7. A body painter comprising a series of carriages adapted to be translated by a conveyor past a fixed station, each carriage being adapted to rotatably mount a target body for rotation about an axis parallel to the direction of conveyor travel, a body rotating linkage on each carriage in driving engagement with the associated target body, paint spraying means at said station aiming toward the path of travel of said target bodies, means to mount said paint spraying means for movement relative to passing target bodies, a plurality of cams mounted on a rotatable drum, and having a common flat at one given rotative position of said drum, shifting means to shift said drum longitudinally, cam follower means controlling the movement of said paint spraying means relative to passing target bodies, interlocking members on said cam follower means and said shifting means, to prevent movement of said shifting means at all times except when said cam followers ride on said common flat whereby said cams may be shifted only at said given rotative position of said drum, endless means at said station engageable by successive carriages to drive said rotatable drum through a single revolution, said endless means being disengaged from successive carriages at positions corresponding to said given rotative position of said drum, and fixed means at said station engageable by successive body rotating linkages to rotate successive target bodies.

8. A body painter comprising a series of carriages adapted to be translated by a conveyor past a fixed station, a cradle rotatably mounted on each of said carriages for rotation about an axis parallel to the direction of conveyor travel and adapted to have a target body fixed thereto, a rotatable gear on each of said carriages having an axis of rotation normal to the direction of conveyor travel, a drive linkage from said gear to said cradle, paint spraying means at said station aiming toward the path of travel of said target bodies, means mounting said paint spraying means for movement relative to passing target bodies, cams, means actuated by said cams to control movement of said paint spraying means relative to passing target bodies, means at said station engageable by successive carriages to drive said cams, a fixed rack adjacent said station and extending parallel to the direction of conveyor travel, said rack being engageable by said rotatable gear on each of said carriages to rotate successive target bodies.

9. In combination with a conveyor carrying a series of spit mountings each being adapted to rotatably support a target body for rotation about an axis parallel to the direction of conveyor travel, a fixed frame, endless flexible linkage means carried on said frame and constrained to enter and leave a path parallel to the direction of conveyor travel, means associated with each of said target bodies to engage said endless means along said path, fixed rack means carried by said fixed frame, each spit mounting comprising a rotatable element engageable by said fixed rack means and paint spraying means carried by said frame and aimed toward the path of travel of said spit mountings, means mounting said paint spraying means for movement relative to passing target bodies, means driven by said endless flexible linkage means to move said paint spraying means relative to passing target bodies.

10. In combination with a conveyor carrying a series of spit mountings each being adapted to rotatably mount a target body for rotation about an axis parallel to the direction along which it is longitudinally transposed by said conveyor, a fixed frame, paint spraying means carried adjacent said frame, means to rotate said target bodies as they pass said paint spraying means, said paint spraying means being fixed against motion parallel to the direction of motion of said conveyor and being aimed toward the path of said target bodies, means to maintain said paint spraying means as a substantially constant distance from the surface of each passing target body, and means to traverse said paint spraying means to maintain the velocity at which said body surface moves past said paint spraying means substantially constant, means to mount said paint spraying means for the aforesaid movements, said means to rotate said target bodies comprising a rotatable gear in association with each rotatable spit element and a stationary rack carried by said fixed frame and engageable by said rotatable gear.

11. In combination with a conveyor carrying a series of spit mountings each being adapted to rotatably support a target body for rotation about an axis parallel to the direction along which it is longitudinally transposed by said conveyor past a station, longitudinally fixed paint spraying means at said station, first linkage means to move said paint spraying means toward and away from the surface of a passing target body, second linkage means to traverse said paint spraying means about an axis parallel to the axis about which said target body is rotated, means mounting said paint spraying means for the aforesaid movements, rotary cam means to actuate said first and second linkage means, endless flexible means carried by a fixed frame and in driving connection with said rotary cam means, and means associated with each of said spit mountings to engage said endless flexible means to drive said endless flexible means through a substantial portion of one complete cycle, whereby said rotary cam means is driven through one revolution.

12. A device as defined in claim 11 in which said first linkage means comprises a swinging arm constrained to swing transversely to the direction of conveyor travel and rotatably mounting said paint spraying means at its outer end, said second linkage means comprising flexible control means to rotate said paint spraying means on said rotatable mounting, reel means to wind said flexible control means in and out, the center of rotation of said reel means lying on the pivotal axis of said swinging arm.

13. A body painter comprising a series of carriages adapted to be translated by a conveyor past a fixed station, each carriage bearing a rotatable spit mounting for rotation about an axis parallel to the direction of conveyor travel, each rotatable spit mounting being adapted to carry a target body for rotation about said axis paint spraying means at said station aiming toward the path of travel of said target bodies, means mounting said paint spraying means for in and out movement and for traversing movement, cams, cam controlled means to move said paint spraying means in and out, cam controlled means to traverse said paint spraying means, endless means at said station engageable by successive carriages to drive said cams, and longitudinally extending fixed means at said station engageable by successive rotatable split mountings to rotate successive target bodies.

14. A body painter comprising a series of carriages supported by a conveyor at spaced intervals along said conveyor whereby said carriages are translated past a fixed station, each carriage being adapted to rotatably mount a target body for rotation about an axis parallel to the direction of conveyor travel, a body rotating linkage on each carriage in driving engagement with its associated target body, a driving gear associated with each body rotating linkage and having two rotative positions at which the associated body is in a given single rotative position, paint spraying means at said station aiming toward the path of travel of said target bodies, means mounting said paint spraying means for in and out movement and for traversing movement, cams, cam actuated means to move said paint spraying means in and out, cam actuated means to traverse said paint spraying means, endless means at said station engageable by successive carriages to drive said cams, fixed rack means at said station engageable by successive driving gears to rotate successive target bodies, means associated with said rack means and with said driving gears to initially engage said gears with said rack at one of said two rotative positions of each of said driving gears, said last named means comprising a pair of diametrically opposite rollers on each of said driving gears and a cam adjacent the initially engaged end of said rack and overlying one side of the path of each of said driving gears, said cam having a rising leading face and a flat center face whereby one of said pair of rollers will initially contact said cam and rotate the associated driving gear to bring both of said pair of rollers into contact with said cam and to turn the associated driving gear to one of said two rotative positions.

HOWARD V. SCHWEITZER.
WILLIAM C. ALBERTSON, Jr.

References Cited in the file of this patent

UNITED STATES PATENTS

| Number | Name | Date |
| --- | --- | --- |
| 2,195,475 | Wallace et al. | Apr. 2, 1940 |
| 2,286,571 | Pollard | June 16, 1942 |
| 2,321,983 | Brackett | June 15, 1943 |
| 2,344,108 | Roselund | Mar. 14, 1944 |
| 2,345,834 | Schweitzer | Apr. 4, 1944 |
| 2,383,503 | Landis et al. | Aug. 28, 1945 |

FOREIGN PATENTS

| Number | Country | Date |
| --- | --- | --- |
| 320,664 | Great Britain | Oct. 21, 1929 |